(12) United States Patent
Marupaduga

(10) Patent No.: US 11,343,717 B1
(45) Date of Patent: May 24, 2022

(54) DYNAMIC CONTROL OF UPLINK COMMUNICATION FROM A DUAL-CONNECTED DEVICE, BASED ON UPLINK BACKHAUL CONGESTION PER CONNECTION

(71) Applicant: Sprint Spectrum L.P., Overland Park, KS (US)

(72) Inventor: Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 8 days.

(21) Appl. No.: 16/948,060

(22) Filed: Aug. 28, 2020

(51) Int. Cl.
| | |
|---|---|
| *H04W 28/08* | (2009.01) |
| *H04W 28/02* | (2009.01) |
| *H04W 88/10* | (2009.01) |
| *H04W 88/14* | (2009.01) |
| *H04W 92/10* | (2009.01) |

(52) U.S. Cl.
CPC ... *H04W 28/0858* (2020.05); *H04W 28/0257* (2013.01); *H04W 28/0289* (2013.01); *H04W 28/0838* (2020.05); *H04W 88/10* (2013.01); *H04W 88/14* (2013.01); *H04W 92/10* (2013.01)

(58) Field of Classification Search
CPC ............. H04W 28/0858; H04W 28/08; H04W 28/0838; H04W 28/02; H04W 28/0252; H04W 28/0257; H04W 28/0289
See application file for complete search history.

(56) References Cited

U.S. PATENT DOCUMENTS

| | | | |
|---|---|---|---|
| 8,185,060 B2 | 5/2012 | Agashe et al. | |
| 8,285,321 B2 | 10/2012 | Ji et al. | |
| 9,392,515 B2 | 7/2016 | Wang et al. | |
| 9,699,800 B2 | 7/2017 | Himayat et al. | |
| 9,814,044 B1 * | 11/2017 | Sevindik | H04W 16/04 |
| 10,104,584 B2 * | 10/2018 | Cai | H04W 36/0033 |
| 10,141,983 B2 | 11/2018 | Kim et al. | |
| 10,237,735 B2 | 3/2019 | Kim et al. | |
| 10,292,140 B2 | 5/2019 | Nam et al. | |

(Continued)

OTHER PUBLICATIONS

Tariq Mumtaz, et al., "Dual Connectivity-Based Mobility Management and Data Split Mechanism in 4G/5G Cellular Networks," IEEE Access, vol. 8, May 20, 2020.

*Primary Examiner* — Robert C Scheibel

(57) ABSTRACT

A method and system for controlling uplink communication from a user equipment device (UE) that has at least two co-existing air-interface connections including a first air-interface connection with a first access node and a second air-interface connection with a second access node. An example method includes comparing a level of uplink backhaul congestion of the first access node with a level of uplink backhaul congestion of the second access node and, based at least on the comparing, configuring an uplink split ratio defining a distribution of uplink user-plane data flow of the UE between at least the first air-interface connection and the second air-interface connection. In an example implementation, this could involve configuring one of the air-interface connections as a primary uplink path to which the UE restricts its uplink communication unless and until a trigger occurs for transitioning the UE to operate in an split-uplink mode.

18 Claims, 4 Drawing Sheets

(56) References Cited

U.S. PATENT DOCUMENTS

| | | | |
|---|---|---|---|
| 10,314,055 B1 | 6/2019 | Marupaduga et al. | |
| 2015/0085800 A1* | 3/2015 | Sivanesan | H04L 1/1887 |
| | | | 370/329 |
| 2016/0234714 A1 | 8/2016 | Basu Mallick et al. | |
| 2017/0019811 A1* | 1/2017 | Parulkar | H04L 41/0654 |
| 2018/0352477 A1* | 12/2018 | Singh | H04W 72/0433 |
| 2019/0098606 A1* | 3/2019 | Sharma | H04B 7/0404 |
| 2019/0098621 A1* | 3/2019 | Hong | H04W 76/15 |
| 2020/0205213 A1* | 6/2020 | Marco | H04W 76/15 |

* cited by examiner

DYNAMIC CONTROL OF UPLINK
COMMUNICATION FROM A
DUAL-CONNECTED DEVICE, BASED ON
UPLINK BACKHAUL CONGESTION PER
CONNECTION

BACKGROUND

A typical wireless communication system includes a number of access nodes that are configured to provide coverage in which user equipment devices (UEs) such as cell phones, tablet computers, machine-type-communication devices, tracking devices, embedded wireless modules, and/or other wirelessly equipped communication devices (whether or not user operated), can operate. Further, each access node could be coupled with a core network that provides connectivity with various application servers and/or transport networks, such as the public switched telephone network (PSTN) and/or the Internet for instance. With this arrangement, a UE within coverage of the system could engage in air-interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And recently, the industry has completed initial specifications for "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could be configured to provide coverage and service on one or more radio-frequency (RF) carriers. Each such carrier could be frequency division duplex (FDD), with separate frequency channels for downlink and uplink communication, or time division duplex (TDD), with a single frequency channel multiplexed over time between downlink and uplink use. And each such frequency channel could be defined as a specific range of frequency (e.g., in RF spectrum) having a bandwidth and a center frequency and thus extending from a low-end frequency to a high-end frequency.

Further each carrier could be defined within an industry standard frequency band, by its frequency channel(s) being defined within the frequency band. Examples of such frequency bands include (i) bands 2, 4, 12, 25, 26, 66, 71, and 85, supporting FDD carriers (ii) band 41, supporting TDD carriers, and (iii) bands n258, n260, and n261, supporting FDD and TDD carriers, among numerous other possibilities.

On the downlink and uplink, the air interface provided by an access node on a given carrier could be configured in a specific manner to define physical resources for carrying information wirelessly between the access node and UEs.

Without limitation, for instance, the air interface could be divided over time into a continuum of frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval, the resource elements on the downlink and uplink could be grouped to define physical resource blocks (PRBs) that the access node could allocate as needed to carry data between the access node and served UEs.

In addition, certain resource elements on the example air interface could be reserved for special purposes.

For instance, on the downlink, certain resource elements could be reserved to carry synchronization signals that UEs could detect as an indication of the presence of coverage and to establish frame timing. Further, the synchronization signals could also function as reference signals that UEs could measure in order to determine coverage strength, or other resource elements could be reserved to carry a separate reference signal for that purpose. And still further, other resource elements could be reserved to carry other control signaling such as PRB-scheduling directives and acknowledgement messaging from the access node to served UEs.

And on the uplink, certain resource elements could be reserved to carry random access signaling from UEs to the access node, and other resource elements could be reserved to carry other control signaling such as PRB-scheduling requests and acknowledgement signaling from UEs to the access node.

OVERVIEW

When a UE enters into coverage of an example network, the UE could detect threshold strong coverage of an access node on a particular carrier (e.g., a threshold strong reference signal broadcast by the access node on the carrier) and could then engage in random-access and connection signaling, such as Radio Resource Control (RRC) signaling, to establish an air-interface connection (e.g., RRC connection) through which the access node will then serve the UE on that carrier.

Further, if the UE is not already registered for service with the core network, the UE could transmit to the access node an attach request, which the access node could forward to a core-network controller for processing. And the core-network controller and access node could then coordinate setup for the UE of one or more user-plane bearers, each including (i) an access-bearer portion that extends between the access node and a core-network gateway system that provides connectivity with a transport network and (i) a data-radio-bearer portion that extends over the air between the access node and the UE.

Once the UE is so connected and registered, the access node could then serve the UE in a connected mode over the air-interface connection, managing downlink air-interface communication of packet data to the UE and uplink air-interface communication of packet data from the UE.

For instance, when the core-network gateway receives user-plane data for transmission to the UE, the data could flow from the core network to the access node, and the access node could buffer the data, pending transmission of the data to the UE. With the example air-interface configuration noted above, the access node could then allocate downlink PRBs in an upcoming subframe for carrying at least a portion of the data to the UE. And the access node could then transmit to the UE scheduling directive that designates the allocated PRBs, and the access node could accordingly transmit the data to the UE in those designated PRBs.

Likewise, on the uplink, when the UE has user-plane data for transmission on the transport network, the UE could buffer the data, pending transmission of the data to the access node, and the UE could transmit to the access node a scheduling request that indicates the quantity of data buffered for transmission. With the example air-interface configuration noted above, the access node could then allocate uplink PRBs in an upcoming subframe to carry at least a portion of the data from the UE and could transmit to the UE a scheduling directive that designates those upcoming PRBs. And the UE could then accordingly transmit the data to the access node in the designated PRBs, and the access node could forward the data to the gateway system for transmission on the transport network.

An access node that is configured to operate on more than one carrier may also provide a UE with carrier-aggregation service, serving the UE on a combination of multiple carriers at once to help provide the UE with increased peak data rate of communication.

To configure carrier-aggregation service for a UE when the UE is connected with the access node on a given carrier, the access node could add one or more carriers to the UE's air-interface connection. For instance, the access node could update a context record for the UE's connection to indicate the multiple carriers, and the access node could transmit to the UE an RRC connection-reconfiguration message or the like that lists the multiple carriers, so that the UE can be prepared to operate on those multiple carriers. With carrier-aggregation configured, the access node could then schedule downlink communications to the UE on PRBs across the multiple carriers in the UE's connection. And if uplink carrier-aggregation is supported, the access node could also schedule uplink communications from the UE on PRBs across the multiple carriers.

In addition, when the industry advances from one generation of wireless technology to the next, or in other scenarios, networks and UEs may also support dual-connectivity service, where a UE is served on co-existing connections, perhaps according to multiple different RATs.

For instance, a first access node could provide service according to a first RAT and a second access node could provide service according to a second RAT, and a UE positioned concurrently within coverage of both the first and second access nodes could have a first radio configured to engage in service according to the first RAT and a second radio configured to engage in service according to the second RAT. With this arrangement, the UE within coverage of both access nodes may be able to establish a first air-interface connection with the first access node according to the first RAT and a second air-interface connection with the second access node according to the second RAT, and the access nodes may then concurrently serve the UE over those connections according to their respective RATs.

Such dual-connectivity (or "non-standalone" connectivity) could also help facilitate increased peak data-rate of communications, by multiplexing the UE's communications across the multiple air-interface connections. Further or alternatively, dual-connectivity may provide other benefits compared with serving a UE on a single connection (as "standalone" connectivity).

In a representative dual-connectivity implementation, one of the access nodes could operate as a master node (MN), responsible for coordinating setup, management, and teardown of dual-connectivity service for the UE and functioning as an anchor point for RRC signaling and core-network control signaling related to the dual-connected UE. And each of one or more other access nodes could operate as a secondary node (SN) mainly to provide additional connectivity and increased aggregate bandwidth for the UE.

In such an implementation, the UE might initially establish a first air-interface connection between the UE and the MN in the manner noted above for instance, with the first air-interface connection then or later encompassing one or more carriers on which the MN provides service. And upon determining that the UE supports dual-connectivity service, the MN might then coordinate setup of dual connectivity for the UE.

Coordinating setup of dual connectivity for the UE could involve engaging in signaling to coordinate setup of a second air-interface connection between the UE and the SN. For instance, the MN could engage in signaling with the SN to arrange for setup of the second connection, and the MN could engage in signaling with the UE to cause the UE to access the SN and complete setup of the second connection. Further, the second air-interface connection could likewise then or later encompass one or more carriers on which the SN provides service.

In addition, coordinating setup of dual connectivity for the UE could also involve engaging in signaling, for each of one or more bearers established for the UE, to split the bearer so that the MN and SN can then each serve a portion of the UE's data communications. For instance, the MN could engage in signaling to establish a bearer split at the core-network gateway system, with one access-bearer leg extending between the gateway system and the MN and another access-bearer leg extending between the gateway system and the SN. Alternatively, the MN could engaging signaling to establish a bearer split at the MN, with the UE's access bearer remaining anchored at the MN and a branch of the access bearer extending between the MN and the SN. And still alternatively, the MN could engage in signaling to establish a bearer split at the SN, with the UE's access bearer being transferred to and anchored at the SN and a branch of the access bearer extending between the SN and the MN.

With dual-connectivity so configured by way of example, the MN and SN could then serve the UE with packet-data communications over their respective connections with the UE, with each access node coordinating air-interface communication in the manner described above for instance.

In an example implementation, the UE's downlink user-plane data flow would be split between the UE's two connections. For instance, when the core-network gateway system has data destined to the UE, that data could flow over a split bearer like one of those noted above, with the MN ultimately receiving a portion of the data and transmitting that portion of data over the UE's first air-interface connection to the UE, and with the SN ultimately receiving another portion of the data and transmitting that other portion of data over the UE's second air-interface connection to the UE. Further, if the MN is the controller of the UE's dual-connectivity service, the MN could be responsible for configuring a downlink split ratio such as what percentage of the UE's downlink data flow would be so handled by the MN versus by the SN. Or the downlink split ratio could be predefined and preset.

Likewise, the UE's uplink user-plane data flow could also be split between the UE's two connections. For instance, when the UE has data to transmit on the transport network, the UE could transmit a portion of that data over its first air-interface connection to the MN, and that data could flow over an access bearer from the MN to the core-network gateway system for output onto the transport network, and the UE could transmit another portion of the data over its second air-interface connection to the SN, and that data could similarly flow over an access bearer from the SN to the core-network gateway system for output onto the transport network. And similarly here, if the MN is the controller of the UE's dual-connectivity service, the MN could be responsible for configuring an uplink split ratio such as what percentage of the UE's uplink data flow the UE should transmit over its first air-interface connection to the MN versus over its second air-interface connection to the SN.

As to the uplink data split in dual connectivity, one of the UE's connections could be designated as the UE's "primary uplink path," and the UE's other connection could be designated as the UE's "secondary uplink path." For instance, the UE's air-interface connection with the MN could be designated as the UE's primary uplink path, and the UE's air-interface connection with the SN could be designated as the UE's secondary uplink path. Or the UE's air-interface connection with the SN could be designated as the UE's primary uplink path, and the UE's air-interface connection with the MN could be designated as the UE's secondary uplink path.

And in an example implementation, the UE could be configured by default to operate in a single-connection-uplink mode, limiting its uplink data flow to just its primary uplink path, unless and until a trigger occurs for transitioning the UE to operate instead in an uplink-split mode in which the UE would transmit a portion of its data on its primary uplink path and another portion of its data on its secondary uplink path. Without limitation, an example of such a trigger could be the UE's rate of uplink data flow becoming threshold high. Thus, the UE may by default engage in uplink user-plane transmission on just its primary uplink path. But once the UE's rate of uplink data flow becomes threshold high, the UE could then transition to an uplink-split mode in which the UE would transmit a portion of its data on its primary uplink path and would transmit the remainder of its data on its secondary uplink path.

In this implementation as well, if the MN is the controller of the UE's dual-connectivity, the MN could be responsible for designating which of the UE's connections will be the UE's primary uplink path. Further, when the UE will operate in the uplink-split mode, as noted above, the MN could be responsible for configuring the UE's uplink split ratio.

One technical concern that could arise in such a system is that each access node serving a UE may have a different respective level of uplink backhaul congestion that could respectively impact the access node's ability to send the UE's uplink data communications over an access bearer into the core network.

In an example arrangement, for instance, each access node may have a respective uplink backhaul path, possibly keyed to the carrier (or carriers) on which the access node is serving the UE, and each such uplink backhaul path may have a respective maximum bit rate limitation. At times when the access node has greater than that maximum bit rate of data (e.g., user-plane data and/or control-plane data) to transmit through the uplink backhaul path, the access node may thus need to buffer the excess. And the extent of such buffering could be an example metric defining the access node's respective level of uplink backhaul congestion.

The present disclosure provides for taking into account the levels of uplink backhaul congestion corresponding respectively with each of a dual-connected UE's air-interface connections, and using those levels of uplink backhaul congestion as a basis to control the UE's uplink air-interface communication. In one respect, for instance, based on a comparison of the levels of uplink backhaul congestion corresponding with the UE's multiple air-interface connections, the UE's serving MN could configure as the UE's primary uplink path the air-interface connection that has the lowest level of uplink backhaul congestion. And in another respect, based on such a comparison, the MN could configure an uplink split ratio for the UE, such as by setting the uplink split ratio to be inversely proportional to a ratio of the levels of uplink backhaul congestion of the UE's air-interface connections.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
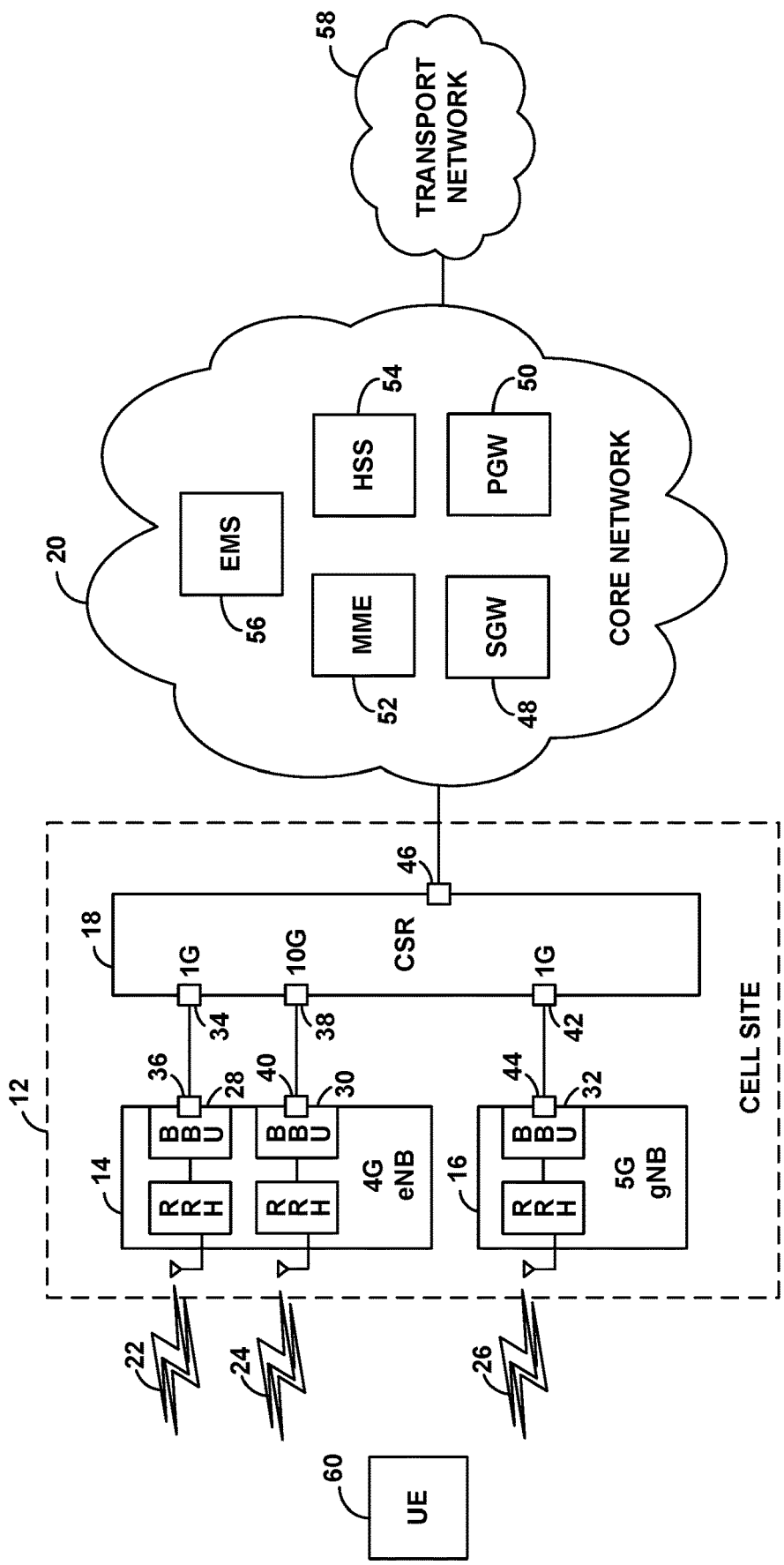
FIG. 1 is a simplified block diagram of an example wireless communication system in which features of the present disclosure can be implemented.

An example implementation will now be described in the context of 4G LTE, 5G NR, and 4G-5G dual connectivity, referred to as EUTRA-NR Dual Connectivity (EN-DC).

With EN-DC, a 4G access node (4G evolved Node-B (eNB)) functions as the MN, and a 5G access node (5G next-generation Node-B (gNB)) functions the SN. Thus, a UE would first establish a standalone-4G connection with a 4G eNB, and the 4G eNB could then coordinate setup of EN-DC service for the UE, including setup for the UE of a secondary 5G connection with the 5G gNB. And the 4G eNB and 5G gNB could then concurrently serve the UE over their respective 4G and 5G connections with the UE.

It should be understood, however, that the principles disclosed herein could extend to apply with respect to other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways. In addition, it will be understood that technical operations disclosed as being carried out by one or more entities could be carried out at least in part by a processing unit programmed to carry out the operations or to cause one or more other entities to carry out the operations Referring to the drawings, as noted above, FIG. 1 is a simplified block diagram of an example wireless communication system in which various disclosed features could be implemented. In particular, the example system includes a cell site 12 having a 4G eNB 14 and a 5G gNB 16 and having a cell site router (CSR) 18 that provides backhaul connectivity between the example access nodes 14, 16 and an example core network 20.

Access nodes 14, 16 could be macro access nodes of the type configured to provide a wide range of coverage or could take other forms, such as small cell access nodes, relays, femtocell access nodes, or the like, possibly configured to provide a smaller range of coverage.

In addition, each access node could be configured to provide coverage and service on one or more carriers, each carrier being in a given frequency band and having a given duplex mode (e.g., FDD or TDD). In the example shown, for instance, the 4G eNB 14 is configured to provide coverage and service on one or more carriers 22, which might be defined in given frequency band, and one or more other carriers 24, which might be defined in another frequency band. And the 5G gNB 16 is configured to provide one or more cells 26, which might be defined in one of those frequency bands or in another frequency band.

Further, the air interface on each carrier could be structured as described above by way of example, being divided over time into frames, subframes, and symbol time segments, and over frequency into subcarriers, thus defining an array of air-interface resource elements grouped into PRBs allocable by the access node as noted above, for use to carry data to or from served UEs. Carrier-structure and/or service on the 4G and 5G air-interfaces, however, could differ from each other in various ways now known or later developed, such as with one implementing variable subcarrier spacing and the other having fixed subcarrier spacing, with one having flexible TDD configuration and the other having fixed TDD configuration, with one having different subcarrier spacing and/or symbol time segment length than the other, and/or with one making different use of MIMO technologies than the other, among other possibilities.

In an example implementation as shown in FIG. 1, each of the access nodes 14, 16 could include at least one antenna structure, at least one remote radio head (RRH), and at least one baseband unit (BBU). For example, the cell site 12 could include a massive-MIMO antenna array shared by the access nodes, or each access node could have its own respective antenna array. Each RRH of an access node could then include a radio and other RF circuitry defining an RF transmit chain and an RF receive chain, with components such as power amplifiers, filters, and digital-analog converters, to facilitate RF communication via the access node's antenna structure. And each BBU of an access node could include processing components to facilitate baseband signal processing, general access node control, and backhaul communication.

With this arrangement, each BBU could be configured to handle communications on a given frequency band. Therefore, if the 4G eNB 14 is configured to provide service on at least two different frequency bands, then the 4G eNB 14 might include at least two BBUs 28, 30. BBU 28 could be configured to handle communications on the one or more carriers 22 of one frequency band, and BBU 30 could be configured to handle communications on the one or more carriers 24 of another frequency band. And if the 5G gNB 16 is configured to provide service on a single frequency band, then the 5G gNB 16 might include just a single BBU 32 configured to handle communications on the one or more carriers 26 of that single frequency band.

In a representative arrangement, the example cell site 12 could include an antenna tower and an equipment room or cabinet at the base of the antenna tower. Each RRH of an access node could be mounted on the tower. And an associated BBU of the access node could be housed in the equipment room or cabinet and connected with the RRH by a multi-fiber cable. Further, the equipment room or cabinet could also house the cell site's CSR 18, which as noted above could provide connectivity with the core network 20.

The CSR 18 could be a network router, configured to forward data packets from point to point, between the cell site 12 and entities on the core network 20, and between the access nodes 14, 16, among other possibilities. As such, the CSR 18 could include multiple ports (e.g., Ethernet ports) supporting physical and logical network connections with other devices.

As shown in FIG. 1, for instance, a port 34 of the CSR 18 could be connected by a network cable with a port 36 of BBU 28 of the 4G eNB 14, another port 38 of the CSR 18 could be connected by a network cable with a port 40 of BBU 30 of the 4G eNB 14, and yet another port 42 of the CSR 18 could be connected by a network cable with a port 44 of BBU 32 of the 5G gNB 16. Further, another port 46 of the CSR 18 could be connected by a network cable with the core network 20 (e.g., with an upstream router, switch, or gateway of the core network 20).

In practice, each such CSR port could be configured with a maximum bit rate, which could define a maximum rate at which the router will allow data to flow through the port. Examples of maximum bit rates could be 100 megabits/second (Mbps), 1 gigabit/second (Gbps), 10 Gbps, and 100 Gbps, among other possibilities. The maximum bit rate per port could be set at the time of manufacture of the router and/or might be configurable and configured after manufacture. Further, the various ports of a given router might have different maximum bit rates than each other.

With this example arrangement, the maximum bit rate per CSR port could define a maximum backhaul bit rate for the BBU that is coupled with the CSR port and thus a maximum backhaul bit rate for service on the one or more carriers served by that BBU. Thus, because BBU 28 of the 4G eNB 14 has backhaul connectivity through CSR port 1 Gbps that has a maximum bit rate of 1 Gbps, the maximum backhaul bit rate for BBU 28 and thus for the one or more carriers 22 served by BBU 28 may be 1 Gbps. Whereas, because BBU 30 of the 4G eNB 14 has backhaul connectivity through CSR port 38 that has a maximum bit rate of 10 Gbps, the maximum backhaul bit rate for BBU 30 and thus for the one or more carriers 24 served by BBU 30 may be 10 Gbps. And because BBU 32 of the 5G gNB 16 has backhaul connectivity through CSR port 42 that has a maximum bit rate of 1 Gbps, the maximum backhaul bit rate of for BBU 32 and thus for the one or more carriers 26 served by the BBU 32 may be 1 Gbps.

These maximum backhaul bit rates could be limitations on uplink backhaul communication and/or on downlink backhaul communication, and there may be different limitations specifically for uplink versus downlink, depending on the implementation. Further, there could be one or more additional bit rate constraints in a BBU's respective backhaul path, and it is also possible that the access nodes at issue may instead be served by different respective CSRs, possibly in different respective cell sites, and possibly coupled with different respective core networks. In any event, for present purposes, each BBU may have a respective maximum uplink backhaul bit rate.

In an example implementation, the core network 20 could be a packet-switched network, such as an Evolved Packet Core (EPC) network or Next Generation Core (NGC) network, supporting Internet Protocol (IP) communication and virtual packet tunnel interfaces between network nodes. In an example EPC arrangement as shown, for instance, the core network 20 includes a serving gateway (SGW) 48, a packet data network gateway (PGW) 50, a mobility management entity (MME) 52, a home subscriber server (HSS) 54, and an element management system (EMS) 56, though other arrangements are possible as well.

With this arrangement, each BBU of an access node could have an assigned IP address on the core network 20, through the BBU's connection with the CSR 18. Each BBU could then communicate with the SGW 48, the SGW 48 could communicate with the PGW 50, and the PGW 50 could provide connectivity with a transport network 58, such as the Internet. Further, each BBU could communicate with the MME 52, and the MME 52 could communicate with the SGW 48, so that the MME 52 could coordinate setup of bearers for UEs to engage in packet-data communication. Still further, the HSS 54 could store or otherwise have access to UE profile records, which could specify service-subscription plans, UE configurations, and/or other such UE capability information. And the EMS 56 could operate as a central repository of operational data for the wireless communication network and to control and manage operation of various network elements.

FIG. 1 also depicts an example UE 60 that may be within coverage of cell site 12 and may be served by the access nodes 14, 16. This UE could take any of the forms noted above, among other possibilities and may have a 4G LTE radio and associated RF circuitry and logic to support 4G LTE service, a 5G NR radio and associated RF circuitry and logic to support 5G NR service, and may further be configured to support EN-DC service.

In line with the discussion above, we can assume for present purposes that UE 60 is currently served with EN-DC by the 4G eNB 14 and the 5G gNB 16, with a 4G connection on one or more of the carriers 22, 24 on which the 4G eNB 14 provides coverage and service, and a 5G connection one or more of the carriers 26 on which the 5G gNB provides coverage and service. For instance, the UE might have established a 4G connection with the 4G eNB 14 on one or more 4G carriers, and the 4G eNB 14, operating as MN, might then have determined from profile data that the UE supports EN-DC service and might therefore have coordinated setup of EN-DC service for the UE, including setup of a 5G connection with the 5G gNB 16 on one or more 5G carriers, and setup of a split bearer.

With EN-DC service configured for the UE, the 4G eNB 14 and 5G gNB 16 could then concurrently serve the UE, each over its respective connection with the UE and each in the manner discussed above.

For instance, when the PGW 50 receives user-plane data from the transport network 58 for transmission to the UE, that data may flow over a split access bearer, and the 4G eNB 14 may transmit a portion of the data over the UE's 4G connection to the UE, while the 5G gNB 16 may transmit another portion of the data over the UE's 5G connection to the UE. And when the UE has user-plane data to transmit on the transport network 58, the UE may transmit a portion of the data over its 4G connection to the 4G eNB 14, which may forward the data over an access bearer for transmission directly or indirectly through the core network 20 to the transport network 58, and the UE may transmit another portion of the data over its 5G connection to the 5G gNB 16, which may likewise forward the data over an access bearer for transmission directly or indirectly through the core network 20 to the transport network 58.

In example operation, for each of the UE's air-interface connections, a single BBU of the UE's serving access node might function as an anchor for backhaul communication of the UE's user-plane data and for any associated control-plane signaling related to service of the UE. Thus, whenever the access node has user-plane data of the UE or associated control-plane signaling data that the access node needs to send to the CSR 18 (e.g., data that the access node received from the UE or from the other access node, for transmission to the core network or for transmission to the other access node), that anchor BBU may be responsible for transmitting that data to the CSR 18.

In the arrangement of FIG. 1, since the 5G gNB 16 has a single BBU 32, that BBU 32 would thus be responsible for such backhaul communication that the 5G gNB is to send to the CSR 18. And as to the 4G eNB 14, if the UE is connected on just one or more carriers served by one of the 4G eNB's BBUs, that one BBU could be responsible for such backhaul communication that the 4G eNB 14 is to send to the CSR 18. Whereas, if the UE is connected concurrently on one or more carriers served by the 4G eNB's BBU 28 and one or more carriers served by the 4G eNB's BBU 30, just one of those two BBUs might be the BBU responsible for such backhaul communication that the 4G eNB 14 is to send to the CSR 18. For instance, one of the UE's 4G carriers could be deemed a primary component carrier (PCC) of the UE's 4G carrier-aggregation, and the BBU serving that carrier could be the one responsible such backhaul communication.

Further in line with the discussion above, in this EN-DC arrangement, the 4G eNB 14, as MN, could be responsible for controlling the extent to which the UE provides uplink transmission on the UE's 4G connection versus on the UE's 5G connection. To exert this control, the 4G eNB 14 could engage in RRC signaling or the like with the UE, directing the UE how the UE should distribute the UE's uplink communication, and the UE could respond to such directives from the 4G eNB 14 by handling the UE's uplink communications accordingly.

For example, the 4G eNB 14 may select either of the UE's 4G and 5G connections to be the UE's primary uplink path that the UE would use exclusively for the UE's uplink communication until the rate of the UE's uplink data flow exceeds a threshold level. The 4G eNB 14 may therefore transmit to the UE an RRC message that specifies the selected connection as the UE's primary uplink path. And in response, the UE may thus restrict its uplink communications to that connection unless and until the UE transitions to the split-uplink mode. Thus, when the UE has uplink data to transmit, the UE may transmit the data on just the selected, designated connection, to the access node serving that connection.

Further, the 4G eNB 14 may set an uplink data-rate threshold or other trigger for transitioning the UE to the split-uplink mode. And the 4G eNB 14 might inform the UE of that trigger to enable the UE to do the transitioning itself when the trigger occurs, or the 4G eNB 14 might monitor for occurrence of the trigger and, when the trigger occurs, then direct the UE to transition the split-uplink mode.

Still further, when the UE is or will operate in the split-uplink mode, the 4G eNB 14 may decide what the UE's uplink split ratio should be, such as what percentage of the UE's uplink user-plane data flow the UE should transmit over its 4G connection to the 4G eNB 14 versus what percentage of the UE's uplink user-plane data flow the UE should transmit over its 5G connection to the 5G gNB 16. The 4G eNB 14 may therefore transmit to the UE an RRC message that specifies the uplink split ratio. And in response, the UE may split its uplink data communications accordingly, transmitting the designated portion of its data on its 4G connection to the 4G eNB and transmitting the other designated portion of its data on its 5G connection to the 5G gNB.

In line with the discussion above, the 4G eNB 14 could control various such aspects of the UE's uplink communication based on a comparison of the uplink backhaul congestion associated respectively with each of the UE's connections. For instance, based on such a comparison, the 4G eNB 14 could select as the UE's primary uplink path the UE's connection having the lower associated uplink backhaul congestion. And/or based on such a comparison, the 4G eNB 14 could set an uplink split ratio for application by the UE. (At an extreme, an uplink split ratio of 100% on one connection and 0% on the other connection could likewise amount to setting as the UE's primary uplink path the connection to which the UE will exclusively limit its uplink user-plane communication.)

The 4G eNB 14 could learn the level of uplink backhaul congestion associated respectively with each of the UE's air-interface connections in various ways.

Without limitation, as to each of the UE's connections, the level of uplink backhaul congestion could be gauged as a difference between the serving access node's associated rate of uplink backhaul communication and the access node's associated maximum uplink backhaul bit rate. For instance, as to each of the UE's connections, the anchor BBU for that connection could have an uplink data rate $R_{BBU}$ representing a quantity of data per unit time that the BBU has for transmission to the CSR 18 (which might include both user-plane data and control-plane signaling data, for the UE and/or for others). And as noted above, the backhaul connection (e.g., the associated CSR port) could have a maximum uplink bit rate $R_{MAX}$. Thus, the level of uplink backhaul congestion per connection could be defined as the extent to which the BBU's uplink data rate is higher than the maximum uplink bit rate, e.g., as the difference $R_{MAX}-R_{BBU}$.

The UE's anchor BBU respectively at each of the UE's serving access nodes might have a record of this or another such measure of its level of uplink backhaul congestion or may be able to establish this or another such measure. For example, each anchor BBU may be provisioned with an indication of its maximum backhaul bit rate, and the anchor BBU may regularly buffer uplink data at times when the anchor BBU's uplink data rate is greater than that maximum backhaul bit rate. The anchor BBU may thus gauge its level of uplink backhaul congestion by monitoring its uplink buffer fullness. For instance, the BBU could maintain a measure of its uplink backhaul congestion as a rolling average or other statistical measure of the quantity of data that the BBU has buffered for uplink transmission per unit time over a sliding window for instance.

The UE's anchor BBU at the 4G eNB 14 could have this measure of its level of uplink backhaul congestion $C_{4G}$ associated with the UE's 4G connection. Further, the UE's anchor BBU at the 5G gNB 16 could have this measure of its level of uplink backhaul congestion $C_{5G}$ associated with the UE's 5G connection and could report the measure to the UE's anchor BBU at the 4G eNB 14 periodically or in response to one or more other triggers. Alternatively, the EMS 56 might have a record of or related to these measures and may report the measures or a comparison of the measures to the UE's anchor BBU at the 4G eNB 14.

The UE's anchor BBU at the 4G eNB 14, and thus the 4G eNB 14, could then use a comparison of these measures as a basis to control the UE's uplink communication as noted above.

For example, the 4G eNB 14 could determine that a given one of the UE's connections has a lower level of uplink backhaul congestion than the UE's other connection, and, based at least on this determination, the 4G eNB 14 could select and configure the UE to treat the given connection as the UE's primary uplink path.

As another example, the 4G eNB 14 could control whether the UE operates in single-connection-uplink mode or rather in split-uplink mode, based on whether the levels of uplink backhaul congestion of the UE's connections are threshold different from each other. For instance, if the 4G eNB 14 determines that a difference between the levels of backhaul congestion of the UE's connections is at least as low as a threshold level, then, based at least on that determination, the 4G eNB 14 could direct the UE to operate in the split-uplink mode rather than in the single-connection-uplink mode. Whereas, if the if the 4G eNB 14 determines that the difference between the levels of backhaul congestion of the UE's connections is greater than that or another higher threshold level, then, based at least on that determination, the 4G eNB 14 could direct the UE to operate in the single-connection-uplink mode rather than in the split-uplink mode.

And as yet another example, when the UE is or will operate in the split-uplink mode, the 4G eNB 14 could establish and configure the UE to apply an uplink split ratio based on a comparison of the levels of uplink backhaul congestion of the UE's connections. As noted above, for instance, the 4G eNB 14 could set the uplink split ratio to be inversely proportional to a ratio of the levels of uplink backhaul congestion of the UE's air-interface connections. For instance, if the 4G eNB 14 determines that the level of uplink backhaul congestion of the UE's 4G connection is 20 Mbps and the level of uplink backhaul congestion of the UE's 5G connection is 10 Mbps, then the 4G eNB 14 may configure the UE's uplink split ratio to provide twice as much uplink transmission on the UE's 5G connection as on the UE's 4G connection.

Variations from these examples, including consideration of additional factors as well, and controlling other aspects of the dual-connected UE's uplink communication, could be possible too.

Figure 2:
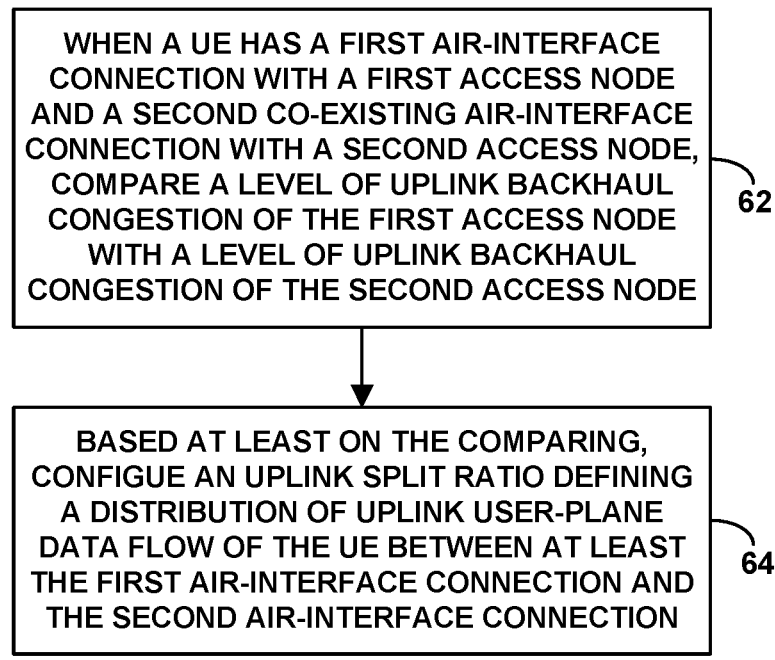
FIG. 2 is a flow chart depicting an example method in accordance with the disclosure.

FIG. 2 is next a flow chart depicting an example method that could be carried out in accordance with the present disclosure to control uplink communication from UE that has at least two co-existing air-interface connections including a first air-interface connection with a first access node and a second air-interface connection with a second access node. As shown in FIG. 2, at block 62, the example method includes comparing a level of uplink backhaul congestion of the first access node with a level of uplink backhaul congestion of the second access node. And at block 64, the example method includes, based at least on the comparing, configuring an uplink split ratio defining a distribution of uplink user-plane data flow of the UE between at least the first air-interface connection and the second air-interface connection.

In line with the discussion above, this method could be carried out by a given one of the first and second access nodes. And in that case, configuring the uplink split ratio could involve transmitting from the given access node to the UE a directive (e.g., an RRC connection-reconfiguration message) that causes the UE to implement the uplink split ratio.

Further, as discussed above, the level of uplink backhaul congestion of the first access node could be based on a rate of uplink data buffering by the first access node in view of a first maximum bit rate limitation of a backhaul connection of the first access node, among other possibilities. And the level of uplink backhaul congestion of the second access node could likewise be based on a rate of uplink data buffering by the second access node in view of a second maximum bit rate of a backhaul connection of the second access node, also among other possibilities.

For example, the backhaul connection of the first access node could include a connection between the first access node and a first CSR port, and the first CSR port might have the first maximum bit rate limitation. And the backhaul connection of the second access node could include a connection between the second access node and a second CSR port, and the second CSR port might have the second maximum bit rate limitation.

As further discussed above, the UE could have a single-connection-uplink mode of operation in which the uplink split ratio is 100% of the uplink user-plane data flow on just one of the first and second air-interface connections and 0% of the uplink user-plane data flow on the other of the first and second air-interface connections.

And in that case, the act of configuring the uplink split ratio based at least on the comparing could involve (i) based on the comparing, selecting a given one of the first and second air-interface connections to be the one air-interface connection on which the UE will provide 100% of the uplink user-plane data flow in the single-connection-uplink mode and (ii) configuring the UE in accordance with the selecting. Here, for instance, the selecting of the given air-interface connection based on the comparing could involve selecting the given air-interface connection based on a determination that the access node with which the UE has the given air-interface connection has lower uplink backhaul congestion than the access node with which the UE has the other of the first and second air-interface connections.

Further, the UE could also have an uplink-split mode of operation in which the uplink data split is greater than 0% respectively on each of the air-interface connections, i.e., where the UE transmits some of its uplink data flow on one of the air-interface connections and other of its uplink data flow on the other of the air-interface connections. And in that case, the act of configuring the uplink split ratio based on the comparing could involve (i) based on the comparing, selecting between the UE operating in the single-connection-uplink mode and the UE operating in the split-uplink mode and (ii) configuring the UE in accordance with the selecting.

Still further, the act of configuring the uplink split ratio based at least on the comparing could involve (i) based on the comparing, selecting a given one of the first and second air-interface connections to carry a majority of the uplink user-plane data flow of the UE and (ii) configuring the UE in accordance with the selecting. Here, for instance, the UE could be configured to transmit greater than 50% of its uplink user-plane data flow on the selected air-interface connection and less than 50% of its uplink user-plane data flow on the other of the first and second air-interface connections. And the selecting of the given air-interface connection based on the comparing could involve selecting the given air-interface connection based on a determination that the access node with which the UE has the given air-interface connection has lower uplink backhaul congestion than the access node with which the UE has the other of the first and second air-interface connections.

Yet further, as discussed above, of the UE's total uplink user-plane data flow, the uplink split ratio could define a ratio of (i) a first percentage of the total that the UE will transmit on the first air interface connection to (ii) second percentage of the total that the UE will transmit on the second air-interface connection. And as noted above, the act of configuring the uplink split ratio based on the comparing could involve setting the uplink split ratio to be inversely proportional to a ratio of (i) the level of uplink backhaul congestion of the first access node to (ii) the level of uplink backhaul congestion of the second access node.

Figure 3:
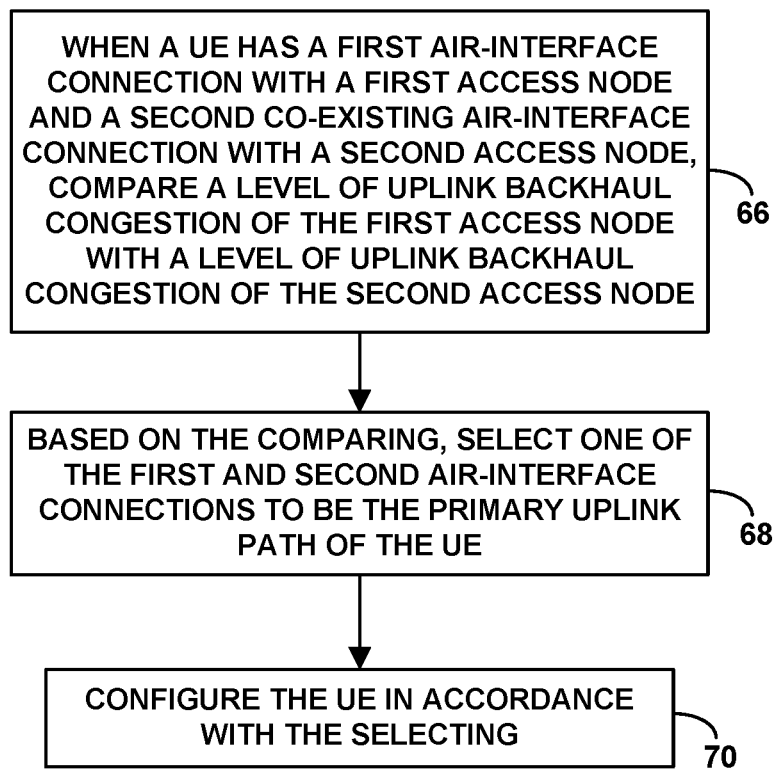
FIG. 3 is another flow chart depicting an example method in accordance with the disclosure.

FIG. 3 is next another flow chart of an example method that could be carried out in accordance with the present disclosure to control uplink communication from a UE that has at least two co-existing air-interface connections including a first air-interface connection with a first access node and a second air-interface connection with a second access node. This method could be operable in a scenario where one of the first and second air-interface connections would define a primary uplink path of the UE to which the UE would restrict its uplink user-plane data transmission unless and until a trigger condition causes the UE to split its uplink user-plane data transmission between the first and second air-interface connections.

As shown in FIG. 3, at block 66, the example method includes comparing a level of uplink backhaul congestion of the first access node with a level of uplink backhaul congestion of the second access node. Further, at block 68, the example method includes selecting, based at least on the comparing, one of the first and second air-interface connections to be the primary uplink path of the UE. And at block 70, the example method includes configuring the UE in accordance with the selecting.

Various features described above can be implemented in this context as well, and vice versa.

For instance, the act of selecting, based at least on the comparing, one of the first and second air-interface connections to be the primary uplink path of the UE could involve (i) determining, based on the comparing, that the level of uplink backhaul congestion of the first access node is greater (e.g., by at least a predefined threshold) than the level of uplink backhaul congestion of the second access node and (ii) based on the determining, selecting the second air-interface connection to be the primary uplink path of the UE.

Figure 4:
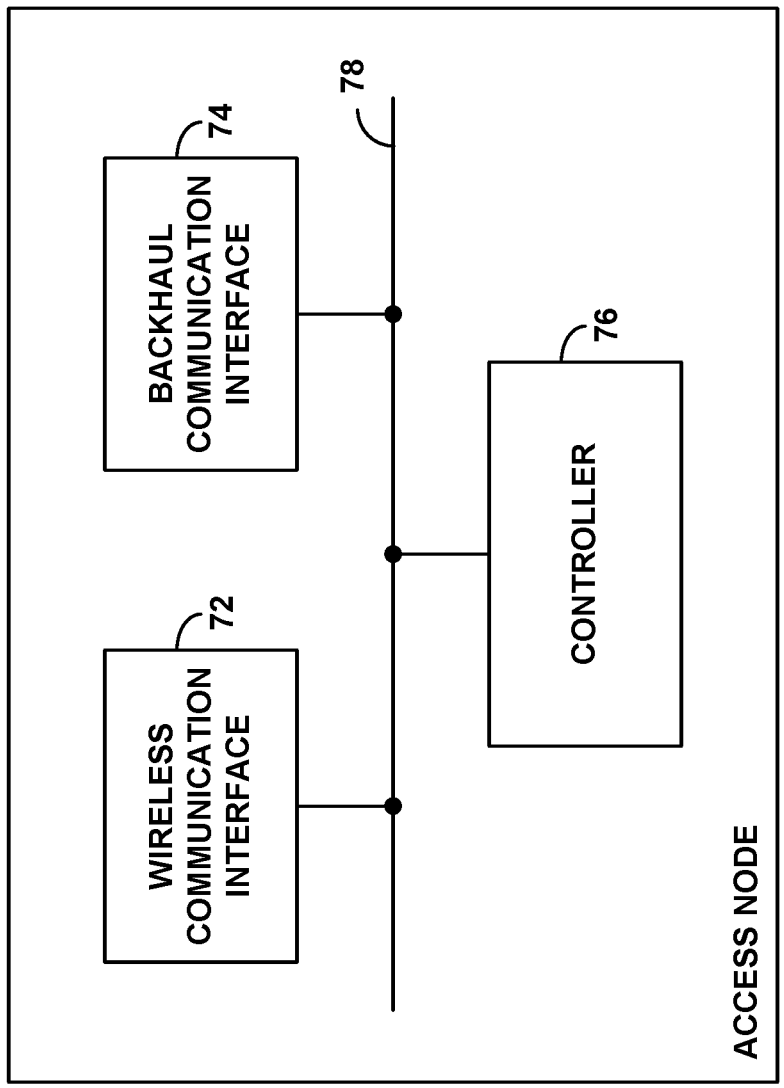
FIG. 4 is a simplified block diagram of an example access node operable in accordance with the disclosure.

Finally, FIG. 4 is a simplified block diagram of an example first access node that could implement various features described herein, to control uplink communication from a UE that has at least two co-existing air-interface connections including a first air-interface connection with the first access node and a second air-interface connection with a second access node. For instance, the first access node could be an MN serving the UE while the UE has dual-connectivity, such as a 4G eNB that serves the UE as part of EN-DC.

As shown in FIG. 4, the example first access node includes a wireless communication interface 72, a backhaul communication interface 74, and a controller 76, all of which could be integrated together and/or communicatively linked together by a system bus, network, or other connection mechanism 78.

In an example implementation, the wireless communication interface 72 could comprise an antenna structure, which could be tower mounted or could take other forms, and associated components such as a power amplifier and a wireless transceiver, so as to facilitate providing coverage on one or more carriers and serving the UE over the first air-interface connection. And the backhaul communication interface 74 could comprise network communication interface such as an Ethernet interface, through which the first access node engages in backhaul communication. For instance, the backhaul communication interface could be a component of or associated with a BBU (not shown) of the first access node.

Further, the controller 76 could comprise one or more processing units (e.g., one or more general purpose processors and/or specialized processors) programmed to cause the first access node to carry out various operations such as those discussed above. For instance, the controller could comprise one or more non-transitory data storage units (e.g., one or more magnetic, optical, or flash storage components) which could store program instructions executable by the one or more processing units to cause the first access node to carry out such operations.

Various other features discussed herein can be implemented in this context as well, and vice versa.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

What is claimed is:

1. A method for controlling uplink communication from a user equipment device (UE) that has at least two co-existing air-interface connections including a first air-interface connection with a first access node and a second air-interface connection with a second access node, the method comprising:
   comparing a level of uplink backhaul congestion of the first access node with a level of uplink backhaul congestion of the second access node; and
   based at least on the comparing, configuring an uplink split ratio defining a distribution of uplink user-plane data flow of the UE between at least the first air-interface connection and the second air-interface connection,
   wherein the level of uplink backhaul congestion of the first access node is based on a rate of uplink data buffering by the first access node in view of an uplink backhaul data rate of the first access node being greater than a maximum bit rate limitation of a backhaul connection of the first access node; and
   wherein the level of uplink backhaul congestion of the second access node is based on a rate of uplink data buffering by the second access node in view of an uplink backhaul data rate of the second access node being greater than a maximum bit rate limitation of a backhaul connection of the second access node.

2. The method of claim 1, wherein the method is carried out by a given one of the first and second access nodes, and wherein configuring the uplink split ratio comprises transmitting from the given access node to the UE a directive that causes the UE to implement the uplink split ratio.

3. The method of claim 1,
   wherein the backhaul connection of the first access node comprises a connection between the first access node and a first cell-site-router (CSR) port, the first CSR port defining the first maximum bit rate limitation, and
   wherein the backhaul connection of the second access node comprises a connection between the second access node and a second CSR port, the second CSR port defining the second maximum bit rate limitation.

4. The method of claim 1, wherein the UE has a single-connection-uplink mode of operation in which the uplink split ratio is 100% of the uplink user-plane data flow on just one of the first and second air-interface connections and 0% of the uplink user-plane data flow on the other of the first and second air-interface connections, and
   wherein configuring the uplink split ratio based at least on the comparing comprises (i) based on the comparing, selecting a given one of the first and second air-interface connections to be the one air-interface connection on which the UE will provide 100% of the uplink user-plane data flow in the single-connection-uplink mode of operation and (ii) configuring the UE in accordance with the selecting.

5. The method of claim 4, wherein selecting the given air-interface connection based on the comparing comprises selecting the given air-interface connection based on a determination that the access node with which the UE has the given air-interface connection has lower uplink backhaul congestion than the access node with which the UE has the other of the first and second air-interface connections.

6. The method of claim 1, wherein the UE has a single-connection-uplink mode of operation in which the uplink data split is 100% on one air-interface connection and 0% on the other air-interface connection, and the UE has an uplink-split mode of operation in which the uplink data split is greater than 0% respectively on each of the air-interface connections, and
   wherein configuring the uplink split ratio based on the comparing comprises (i) based on the comparing, selecting between the UE operating in the single-connection-uplink mode and the UE operating in the split-uplink mode and (ii) configuring the UE in accordance with the selecting.

7. The method of claim 1, wherein configuring the uplink split ratio based at least on the comparing comprises (i) based on the comparing, selecting a given one of the first and second air-interface connections to carry a majority of the uplink user-plane data flow of the UE and (ii) configuring the UE in accordance with the selecting.

8. The method of claim 7, wherein selecting the given air-interface connection based on the comparing comprises selecting the given air-interface connection based on a determination that the access node with which the UE has the given air-interface connection has lower uplink backhaul congestion than the access node with which the UE has the other of the first and second air-interface connections.

9. The method of claim 1, wherein, of a total uplink user-plane data flow of the UE, the uplink split ratio defines a ratio of (i) a first percentage of the total that the UE will transmit on the first air interface connection to (ii) second percentage of the total that the UE will transmit on the second air-interface connection, and
   wherein configuring the uplink split ratio based on the comparing comprises setting the uplink split ratio to be inversely proportional to a ratio of (i) the level of uplink backhaul congestion of the first access node to (ii) the level of uplink backhaul congestion of the second access node.

10. A method for controlling uplink communication from a user equipment device (UE) that has at least two co-existing air-interface connections including a first air-interface connection with a first access node and a second air-interface connection with a second access node, wherein one of the first and second air-interface connections defines a primary uplink path of the UE to which the UE restricts uplink user-plane data transmission of the UE unless and until a trigger condition causes the UE to split the uplink user-plane data transmission of the UE between the first and second air-interface connections, the method comprising:

comparing a level of uplink backhaul congestion of the first access node with a level of uplink backhaul congestion of the second access node;

selecting, based at least on the comparing, one of the first and second air-interface connections to be the primary uplink path of the UE; and configuring the UE in accordance with the selecting, wherein the level of uplink backhaul congestion of the first access node is based on a rate of uplink data buffering by the first access node in view of an uplink backhaul data rate of the first access node being greater than a maximum bit rate limitation of a backhaul connection of the first access node; and wherein the level of uplink backhaul congestion of the second access node is based on a rate of uplink data buffering by the second access node in view of an uplink backhaul data rate of the second access node being greater than a maximum bit rate limitation of a backhaul connection of the second access node.

11. The method of claim 10, wherein the method is carried out by a given one of the first and second access nodes, and wherein configuring the UE in accordance with the selecting comprises transmitting from the given access node to the UE a directive that causes the UE to operate in accordance with the selecting.

12. The method of claim 10, wherein the backhaul connection of the first access node comprises a connection between the first access node and a first cell-site-router (CSR) port, the first CSR port defining the first maximum bit rate limitation, and wherein the backhaul connection of the second access node comprises a connection between the second access node and a second CSR port, the second CSR port defining the second maximum bit rate limitation.

13. The method of claim 10, wherein selecting, based at least on the comparing, one of the first and second air-interface connections to be the primary uplink path of the UE comprises:

determining, based on the comparing, that the level of uplink backhaul congestion of the first access node is greater than the level of uplink backhaul congestion of the second access node; and based on the determining, selecting the second air-interface connection to be the primary uplink path of the UE.

14. The method of claim 10, wherein selecting, based at least on the comparing, one of the first and second air-interface connections to be the primary uplink path of the UE comprises:

determining, based on the comparing, that the level of uplink backhaul congestion of the first access node is more than a predefined threshold greater than the level of uplink backhaul congestion of the second access node; and based on the determining, selecting the second air-interface connection to be the primary uplink path of the UE.

15. A first access node operable to control uplink communication from a user equipment device (UE) that has at least two co-existing air-interface connections including a first air-interface connection with the first access node and a second air-interface connection with a second access node, the first access node comprising:

a wireless communication interface including an antenna structure through which to serve the UE over the first air-interface connection;

a backhaul communication interface through which the engage in backhaul communication; and a controller, wherein the controller causes the first access node to carry out operations including:

comparing a level of uplink backhaul congestion of the first access node with a level of uplink backhaul congestion of the second access node, and based at least on the comparing, configuring an uplink split ratio defining a distribution of uplink user-plane data flow of the UE between at least the first air-interface connection and the second air-interface connection, wherein the level of uplink backhaul congestion of the first access node is based on a rate of uplink data buffering by the first access node in view of an uplink backhaul data rate of the first access node being greater than a maximum bit rate limitation of a backhaul connection of the first access node; and wherein the level of uplink backhaul congestion of the second access node is based on a rate of uplink data buffering by the second access node in view of an uplink backhaul data rate of the second access node being greater than a maximum bit rate limitation of a backhaul connection of the second access node.

16. The first access node of claim 15, wherein the controller comprises a processing unit, non-transitory data storage, and program instructions stored in the non-transitory data storage and executable by the processing unit to carry out the operations.

17. The first access node of claim 16, wherein the controller is integrated with the wireless communication interface.

18. The first access node of claim 15, wherein the UE has a single-connection-uplink mode in which the uplink split ratio is 100% of the uplink user-plane data flow on just one of the first and second air-interface connections and 0% of the uplink user-plane data flow on the other of the first and second air-interface connections, and wherein configuring the uplink split ratio based at least on the comparing comprises (i) based on the comparing, selecting a given one of the first and second air-interface connections to be the one air-interface connection on which the UE will provide 100% of the uplink user-plane data flow in the single-connection-uplink mode and (ii) configuring the UE in accordance with the selecting.

* * * * *